(12) United States Patent

Jayaraman

(10) Patent No.: US 12,620,020 B2
(45) Date of Patent: May 5, 2026

(54) APPLYING PROVISIONAL RESOURCE UTILIZATION THRESHOLDS

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 637 days.

(21) Appl. No.: 18/048,585

(22) Filed: Oct. 21, 2022

(65) Prior Publication Data

US 2024/0134713 A1 Apr. 25, 2024
US 2024/0231948 A9 Jul. 11, 2024

(51) Int. Cl.
G06Q 40/02 (2023.01)

(52) U.S. Cl.
CPC ................................. G06Q 40/02 (2013.01)

(58) Field of Classification Search
USPC ...................................................... 705/35, 44
See application file for complete search history.

(56) References Cited

U.S. PATENT DOCUMENTS 10,681,547 B1 * 6/2020 Yang .................... H04L 63/0263
11,449,388 B1 * 9/2022 Hoffman ............... G06F 3/0683

2006/0150190 A1 7/2006 Gusler
2015/0304292 A1 * 10/2015 Dulkin .................... G06F 21/31
726/7
2020/0065895 A1 * 2/2020 Glassman ............. H04L 67/306

FOREIGN PATENT DOCUMENTS

CN 117492972 A 2/2024

OTHER PUBLICATIONS

The University of Alaska staff, Managing Finance Reports with Vista Plus, Aug. 2008, The University of Alaska, web, 2-20 (Year: 2008).

* cited by examiner

*Primary Examiner* — William E Rankins

(74) *Attorney, Agent, or Firm* — Michael A. Springs, Esq.; Shumaker, Loop & Kendrick, LLP; Patrick B. Horne

(57) ABSTRACT

Disclosed are systems and methods for automatically applying resource utilization thresholds. The systems and methods allow resource utilization to be managed effectively, efficiently, and in a secure fashion. The system can utilization artificial intelligence technology to enhance the accuracy and customization of resource utilization thresholds by properly classifying resource utilization demands and applying threshold limitations directed to particular classifications of resource utilizations.

12 Claims, 8 Drawing Sheets

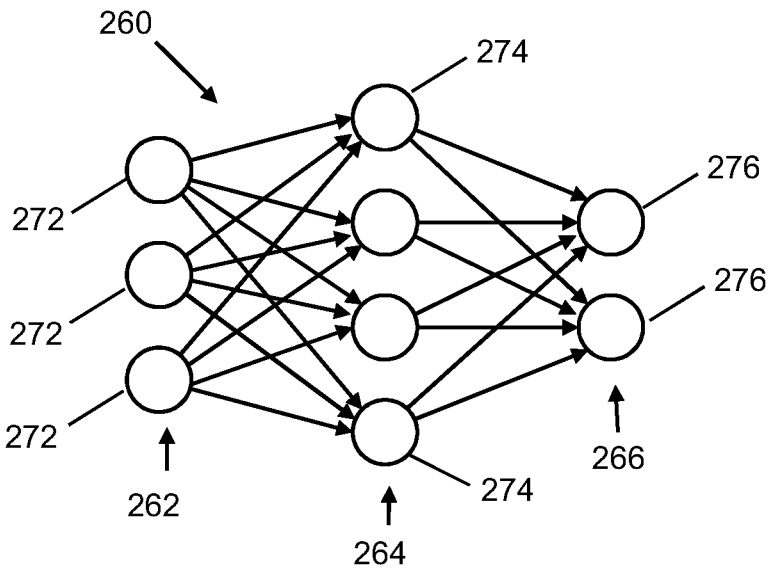
FIG. 2A
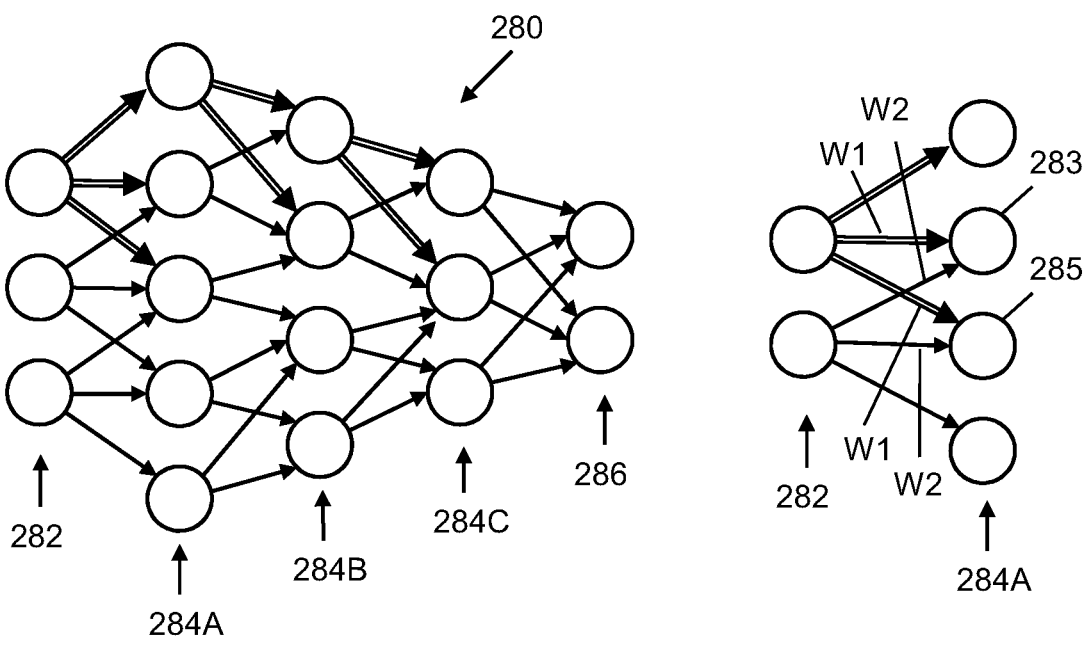
FIG. 2B
FIG. 2C

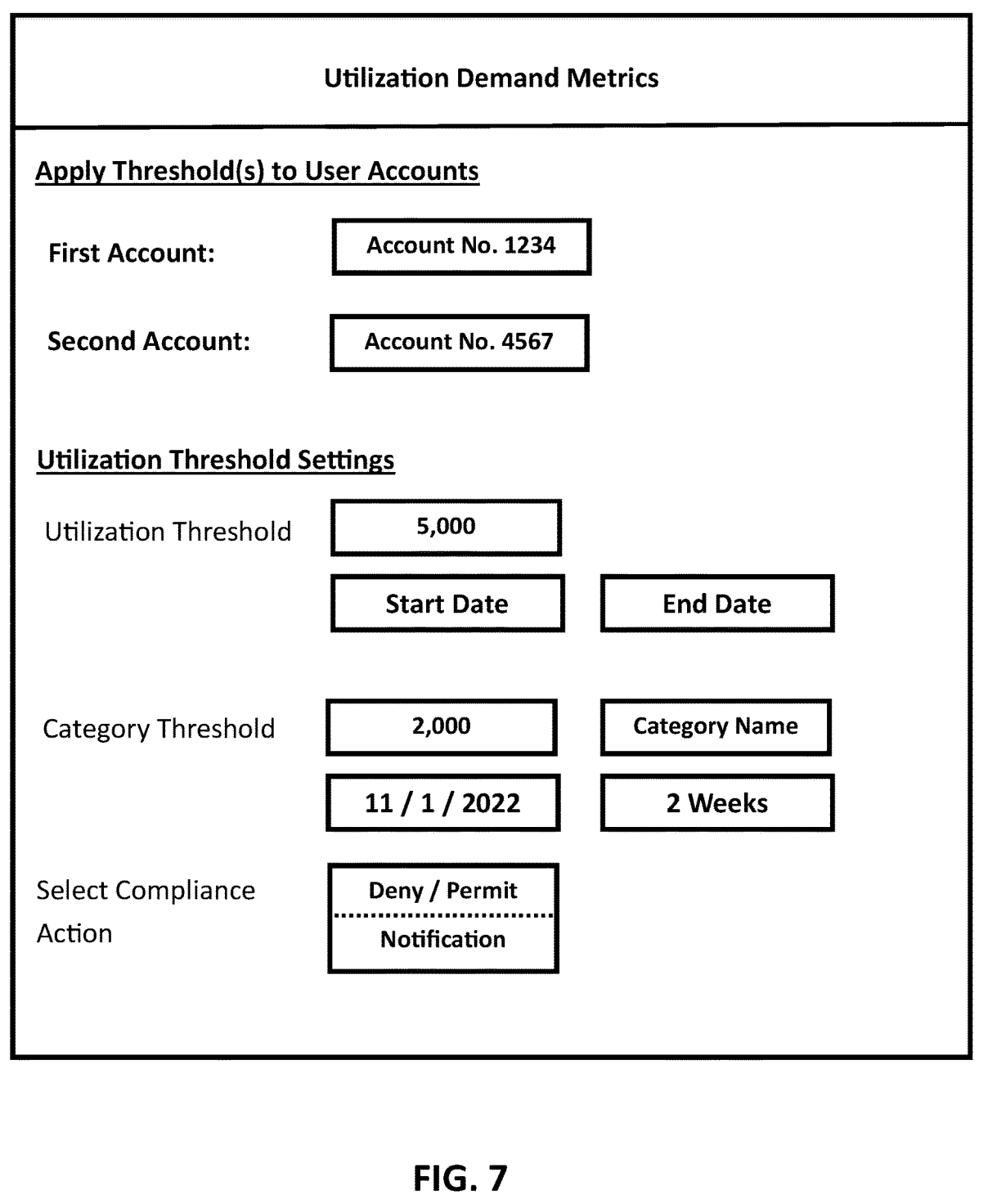

Utilization Demand Metrics

Apply Threshold(s) to User Accounts

First Account:    | Account No. 1234 |

Second Account:    | Account No. 4567 |

Utilization Threshold Settings

Utilization Threshold    | 5,000 |

| Start Date |    | End Date |

Category Threshold    | 2,000 |    | Category Name |

| 11 / 1 / 2022 |    | 2 Weeks |

Select Compliance
Action    | Deny / Permit
............................
Notification |

FIG. 7

APPLYING PROVISIONAL RESOURCE UTILIZATION THRESHOLDS

TECHNICAL FIELD AND BACKGROUND

The present invention relates generally to the field of effective and efficient management of distributed resource utilization, and more particularly, systems and methods for establishing, applying, and managing provisional utilization demand metrics that are customizable according to the needs of individual users.

Individual users often desire to monitor and limit resource utilization over time to ensure future resource requirements are met effectively and efficiently. Monitoring and managing resource utilization, however, can be time consuming and challenging. Resource utilization typically occurs over significant time periods (e.g., days or weeks), is distributed across multiple locations (e.g., a user's residential network or external third-party terminals), and is dedicated for varying purposes (e.g., accomplishing work-related or personal tasks, among others). Resource availability must be frequently monitored, and lapses in monitoring typically result in over-utilization errors. Further, resource requirements are typically dynamic and change over time such that flat, static monitoring metrics do not accommodate the needs of individual systems users.

To address the drawbacks of traditional techniques for managing resource utilization, disclosed herein are systems and methods that allow users to establish, apply, and manage utilization demand metrics that are customizable to individual users. The systems further allow resource utilization to be managed effectively, efficiently, and in a secure fashion using encryption and individual computing device authentication techniques. Moreover, some embodiments permit users to establish and apply utilization metrics created using artificial intelligence techniques that enhance the accuracy and customization of such metrics.

SUMMARY

According to one embodiment, a system for creating and applying resource utilization thresholds includes a network computing device, such as a server, that is operated by a provider. The system also includes a user computing device that can be a personal computer, cellular smart phone, or a "smart card" that includes an integrated microprocessor, memory, and software. The system further includes a terminal computing device operated by a third party and that interacts with the user computing device to implement a resource utilization transaction. The network computing device, terminal computing device, and user computing device each comprise one or more integrated software applications that perform operations to implement the current technology.

As part of processing a resource utilization request, or demand, the user computing device and/or the user must be verified to ensure authenticity and security. The terminal computing device verifies the user computing device by receiving a certificate of authority from the user computing device that is encrypted using an encryption key stored by the user computing device. The terminal computing device decodes, or decrypts, the certificate authority using a public key, and the resulting data, called a received device identifier, can be confirmed by comparison to known values for the received device identifier.

Once verified, the system generates a remote utilization demand, which is a request to utilize resources as part of a transaction between the user and the third party administering or operating the terminal computing device. The remote utilization demand includes utilization value data (i.e., a quantitative measure of resources that are the subject of the demand) and utilization demand time code data (i.e., a time and date corresponding to the remote utilization demand). The remote utilization demand is transmitted to the network computing device.

A Resource Monitor software application running on the network computing device receives the remote utilization demand and retrieves utilization demand metrics stored to a Utilization Demand Metrics database, which is data relating to resource utilization thresholds placed upon individual user's requests to utilize resources. The utilization demand metrics include, without limitation, (i) utilization duration data representing a period of time over which resource utilization thresholds are applied, and (ii) utilization threshold data, which are quantitative limits placed on resource utilization. The Resource Monitor software application also retrieves or receives availability database records stored to a Resource Database on the provider network device. The availability database records include data relating to prior transactions that utilized resources, such as (i) resource value data (i.e., a quantitative measure of resources consumed by a transaction), (ii) utilization event time code data (i.e., the date and time of a transaction that utilized resources), (iii) an available account identifier (i.e., a user account number or other designation where the user account serves as a repository of resources), (iv) a unique user identifier (i.e., an identification number, name, or other designation identifying a user), (v) resource categorization data (i.e., data that categorizes a transaction in which resources were utilized), and (vi) transaction data, which can include a wide variety of data that characterizes a transaction, such as an identification number, geographic location data where a transaction occurred, identifiers for products and services subject to a resource utilization demand, among other types of data.

The Resource Monitor software service executes a utilization threshold analysis to determine whether resource utilization thresholds would be exceeded by processing a remote utilization demand (i.e., would processing a transaction that utilizes resources violate limitations placed on resource utilization or consumption). The utilization threshold analysis generates a threshold evaluation set of availability database records that includes availability database records having utilization event time code data that falls within a duration represented by the utilization duration data. Put another way, the analysis determines whether there are resource utilization limitations that are currently in effect and that apply to the remote utilization demand being processed by the Remote Monitor software service. The analysis then identifies those availability database records that fall within a resource limitation period and includes those records in the threshold evaluation set.

The utilization threshold analysis next aggregates the utilization value data from the remote utilization demand with the resource value data for availability database records within the threshold evaluation set. The aggregated value is designated as current utilization data, which represents a quantitative value of resource utilization within a given time period that includes the current remote utilization demand. The utilization threshold analysis determines whether the aggregated utilization value data and resource value data exceeds the utilization threshold data (i.e., whether the total value exceeds any limits placed on resource utilization).

If the current utilization data exceeds the utilization threshold data (i.e., the current transaction would violate the resource utilization limitations), the system generates a utilization threshold message that includes a demand fail command. If the current utilization data does not exceed the utilization threshold data (i.e., the current transaction would not violate the resource utilization limitations), the system generates a utilization threshold message that includes a demand pass command. The utilization threshold message is transmitted to the terminal computing device for display to a user to indicate whether the remote utilization demand was approved or denied.

In other embodiments, the resource utilization thresholds can be applied to specific categories of transactions that are subject to a remote utilization request. In that case, the utilization demand metrics (i.e., the threshold limitations), are set according to category and designated as utilization category threshold data. The terminal computing device likewise includes information categorizing the transaction that referred to as a terminal source categorization code. And data regarding prior transactions is stored to the Resource Database with a field referred to as resource categorization data that categorizes the prior transactions. In some embodiments, the system utilizes artificial intelligence techniques to categorize incoming remote utilization demands according to accurate and specific categories of transactions, thereby enhancing control and accuracy of limitations placed on resource utilization.

For embodiments that process resource limitations by category, the terminal computing device generates terminal data that includes the terminal source categorization code. The Resource Monitor software service receives the terminal source categorization code from the terminal computing device. Further, the availability database records received by the Resource Monitor software service include the aforementioned resource categorization data, and the utilization threshold data includes the utilization category threshold data. The Remote Monitor software service executes the utilization threshold analysis by generating the threshold evaluation set by identifying and including in the threshold evaluation set only those availability database records having resource categorization data that corresponds to the terminal source categorization code. In other words, the system categorizes the transaction using information from the terminal computing device, and the system analyzes prior transactions corresponding to the same category to determine whether the current utilization demand would exceed limitations placed on transactions in the certain category.

In other embodiments, the system applies limitations to resource utilization according to one or more user accounts. That is, the system monitors and applies resource utilization limits on the quantity of resources that can be utilized from one, or a collection, of user accounts over a given period of time. In that case, the remote utilization demand includes a utilization demand account identifier received from the user computing device. The availability database records received by the Resource Monitor software service also include an available account identifier that identifies the various accounts associated with prior transactions. The utilization demand metrics further include utilization threshold account identifier data associated with the utilization threshold data, where the utilization threshold account identifier data identifies one or more user accounts to which resource utilization limits are to be applied.

With regard to account limitations, the Resource Monitor software service determines whether the utilization demand account identifier matches at least one user account identified by the utilization threshold account identifier data. Put another way—does the account specified in a remote utilization demand correspond to an account on which resource utilization limitations are placed. The Resource Monitor software service then executes the utilization threshold analysis by first generating the threshold evaluation set by identifying and including only availability database records having an available account identifier that matches at least one user account identified by the utilization threshold account identifier data. In short, the system identifies prior transactions that utilized a user account on which resource utilization limits are placed. As before the Resource Monitor software service then determines whether the thresholds on resource utilization for specified accounts have been exceeded.

With regard to notification and enforcing resource utilization thresholds, when the terminal computing device receives a demand fail command, the terminal computing device transmits a message to the user computing device. The message includes display data having content, or alphanumeric text readable by the user, and for display by the user computing device. The content indicates that the utilization threshold data was exceeded, and the remote utilization demand failed or was denied. On the other hand, when the terminal computing device receives a demand pass command, the terminal computing device transmits a message to the user computing device having content data for display by the user computing device that indicates the utilization threshold data was not exceeded and the remote utilization demand passed or was approved.

In yet other embodiments, the terminal computing device can display messages to users indicating whether a remote utilization demand exceeded a threshold or not. That is, when the terminal computing device receives a demand fail command, the terminal computing device displays a message on a digital display device indicating that the remote utilization demand failed. Alternatively, when the terminal computing device receives a demand pass command, the terminal computing device displays a message on the digital display device indicating that the remote utilization demand passed.

With respect to system security, messages transmitted by the user computing device can be subject to encryption. The user computing device in that case includes an integrated private encryption key that is used to encode data transmitted by the user computing device. The user computing device can also be verified by transmitting system configuration data relating to the device system configuration, such as a unique identifier hardcoded into the device, copies of key system files, or a media access control ("MAC") address for the local network of the user computing device. The system configuration data received from the user computing device can be compared to known values to verify the device. In other embodiments the user and/or the user computing device are verified using authentication data transmitted by the user computing device, such as a user name, password, or personal identification number. The system compares the authentication data against known values stored to an identity management service database on the provider computing system.

In yet other embodiments, the system is configured to apply multiple resource utilization thresholds at one time, such as applying thresholds to resource utilization over a given time period, from a particular user account (or accounts), or according to specified categories of transactions. In that case, the user computing device transmits to the terminal computing device, utilization demand data that includes (i) unique user identifier data, (ii) utilization demand account identifier data, and (iii) provider identifier data that identifies the service provider administering the user account. The terminal computing device in turn transmits to the network computing device, the remote utilization demand along with terminal data, such as a terminal source categorization code. The terminal computing device relies on the provider identifier data to properly direct the remote utilization demand and terminal data to the network computing device.

The Resource Monitor software service running on the network computing device receives the remote utilization demand, utilization demand metrics, and availability database records. The utilization demand metrics include (i) utilization duration data, (ii) utilization threshold data, (iii) utilization threshold account identifier data, and (iv) a resource metrics flag that can take a first value or a second value indicating whether or not the Remote Monitor software service should proceed with the utilization threshold analysis (i.e., are there applicable resource utilization thresholds in place that apply to an incoming remote utilization demand). The availability database records each include (i) resource value data, (ii) utilization event time code data, (iii) resource categorization data, and (iv) an available account identifier.

After receiving the appropriate data, the Resource Monitor software service performs operations that include generating a demand pass command when the utilization demand account identifier does not match the utilization threshold account identifier data. That is, if there are no relevant resource utilization threshold limitations in place, the utilization demand can be approved. The demand pass command is transmitted to the terminal computing device for display to a user. In another case, when the resource metrics flag has a first value, the Remote Monitor software service generates a demand pass command that is transmitted to the terminal computing device for display to a user. That is, if the first value of the resource metrics flag indicates that there are no resource utilization thresholds to apply, the remote utilization demand can be approved.

Continuing with the foregoing embodiment, when the resource metrics flag has a second value—indicating that there are relevant resource utilization limitations to apply—the Remote Monitor software service executes the utilization threshold analysis. The analysis generates current utilization demand data by aggregating the utilization value data with the resource value data for particular availability database records. The particular availability database records are those having (i) utilization event time code data that falls within a duration represented by the utilization duration data, and (ii) resource categorization data corresponding to one or more user accounts identified by the utilization demand account identifier data. The utilization threshold analysis then determines whether the current utilization demand data exceeds the utilization threshold data and generates a utilization threshold message having a corresponding demand fail or demand pass command.

For some embodiments, the system performs a utilization classification analysis that categorizes incoming remote utilization demand. The system then applies categorical resource utilization limitations to the remote utilization demands when the category determined by the analysis matches a category specified by utilization category threshold data. The utilization classification analysis utilizes the remote utilization demand, the availability database records, and the user account data. The utilization classification analysis generates received resource categorization data using artificial intelligence techniques.

To implement the utilization classification analysis, the Resource Monitor software service can be implemented using at least one neural network that is used to perform the utilization classification analysis. The neural network can be convolutional neural network that includes at least three intermediate layers and that implements a Latent Dirichlet Allocation model. In another embodiment, the at least one neural network can be a recurrent neural network having a long short-term memory neural network architecture.

BRIEF DESCRIPTION OF THE DRAWINGS

Features, aspects, and advantages of the present invention are better understood when the following detailed description of the invention is read with reference to the accompanying figures described below.

FIG. 2A is a diagram of a feedforward network, according to at least one embodiment, utilized in machine learning.

FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

FIG. 7 is an example Utilization Demand Metrics graphical user interface according to one embodiment.

DETAILED DESCRIPTION

Figure 1:
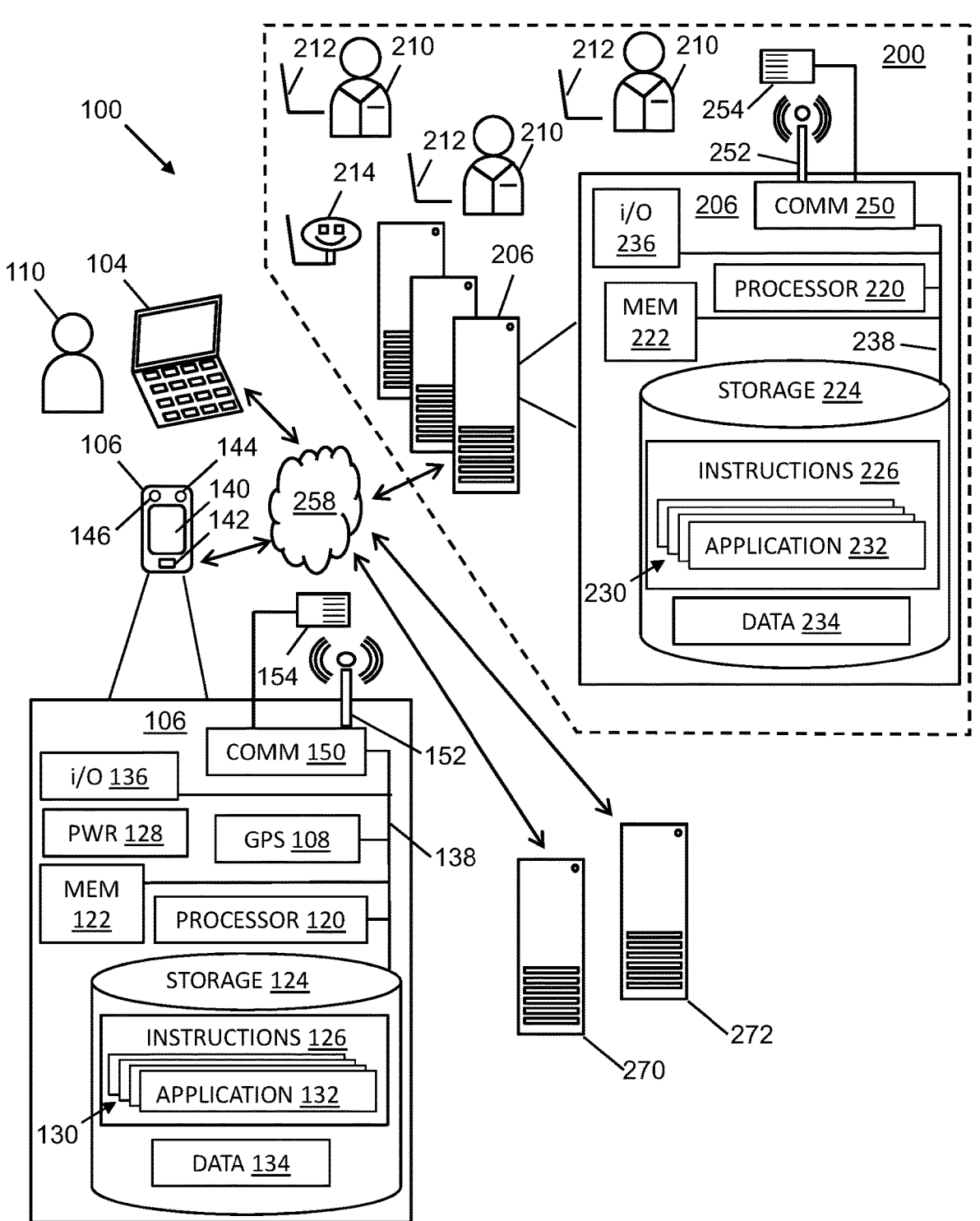
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the term provider generally describes the person or business entity providing account services. The term provider is used interchangeably with the term enterprise. The term account generally denotes a business arrangement providing for regular dealings between the enterprise and a customer. The term user generally describes an individual or entity that utilizes an account or purchases products and services from an enterprise. The term user may be used interchangeably with the terms customer, consumer, or client.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

Disclosed are systems and methods for implementing, applying, and managing utilization demand metrics customizable to individual users. Users and/or user computing devices are authenticated prior to establishing customizable utilization demand metrics or thresholds. Users can interact with a provider system through a web-based portal displayed in an Internet browser software application or through a dedicated mobile software application. Users are provided with a graphical user interface ("GUI") that allows users to establish customizable utilization demand metrics. The utilization demand metrics can be provisional such that thresholds are valid and applied only over a finite time period, and the utilization demand metrics are customizable such that the metrics can be categorized and set to threshold values determined by the user. The systems automatically monitor and aggregate user resource utilization data and authorize resource utilization transactions and generate electronic notifications when certain conditions are met as ascertained using the utilization metrics.

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the enterprise system 200.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The user computing device 104 & 106 incorporates an input and output system 136 operatively coupled to the processor device 120. Output devices include a display 140, which can be, without limitation, a touch screen of the mobile device 106 that serves both as an output device. The touch-screen display provides graphical and text outputs for viewing by one or more users 110 while also functioning as an input device, by providing virtual buttons, selectable options, a virtual keyboard, and other functions that, when touched, control the user computing device. The user output devices can further include an audio device, like a speaker 144.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the enterprise, such as customer service representatives, advisors, managers, and sales team members.

Human agents 210 utilize agent computing devices 212 to interface with the enterprise system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the enterprise) or the user (as a customer or consumer) is utilizing the disclosed systems and methods to segment, parse, filter, analyze, and display hosted content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 & 272 represent a remote hosting provider technology platform that allows end user computing devices 104 or agent computing devices 212 to upload, publish, store, view, and download content data, such as alphanumeric text data, images, and audiovisual data. The technology platform 270 & 272 can include a remote host computing device 270 & 727 implemented as a physical or virtual server.

The external systems 270 & 272 can also represent other types of data sources, users, consumers, customers, enterprises, and groups of any size. In at least one example, the external systems 270 & 272 represent remote terminal utilized by the enterprise system 200 in serving users 110. In another example, the external systems 270 &272 represent electronic systems for processing payment transactions. The system may also utilize software applications that function using external resources 270 &272 available through a third-party provider, such as a Software as a Service ("SaasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

The machine learning modules utilized by the present systems and methods can be implemented with neural networking techniques. Neural networks learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, such as an acyclic graph with nodes arranged in layers.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
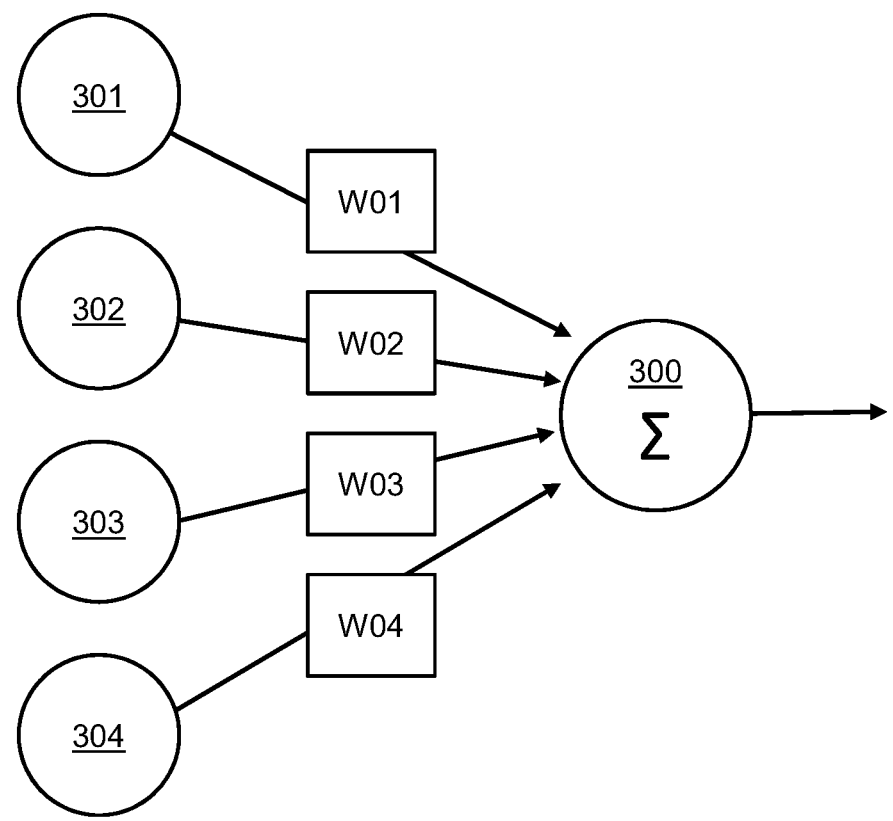
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network.

Figure 4:
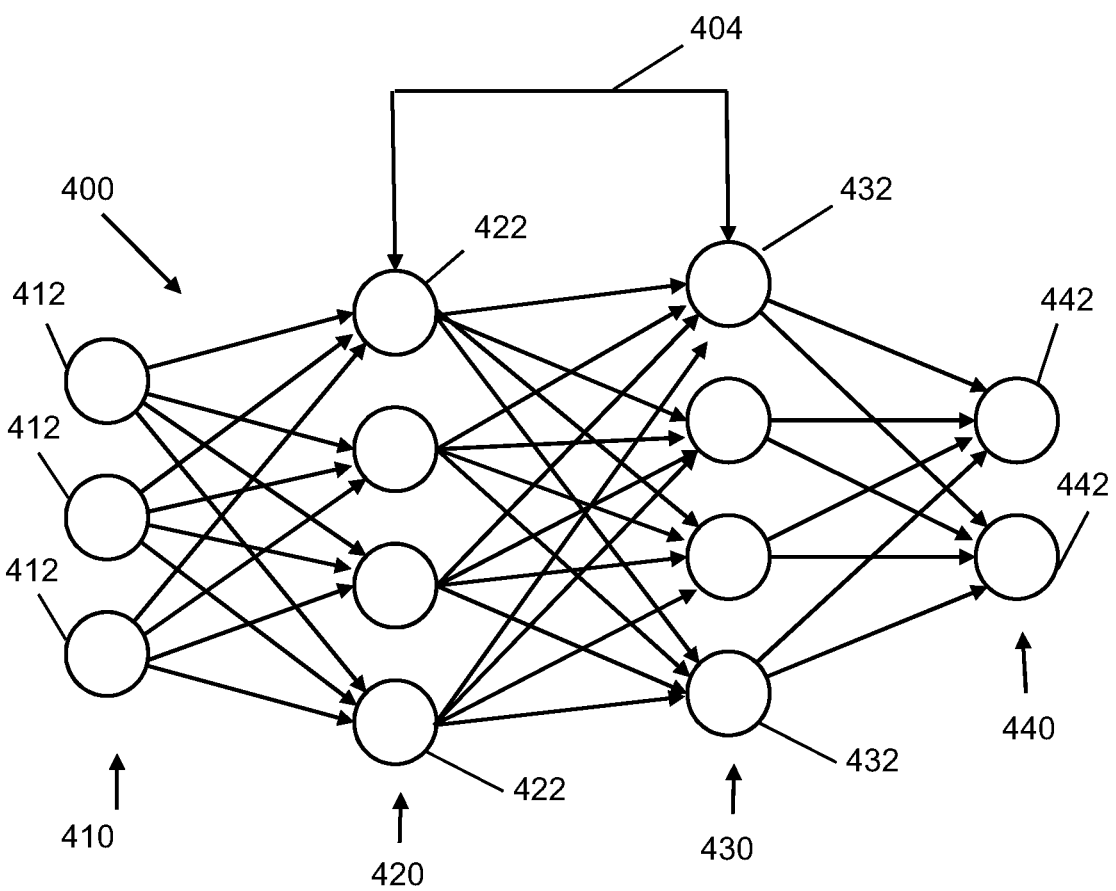
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
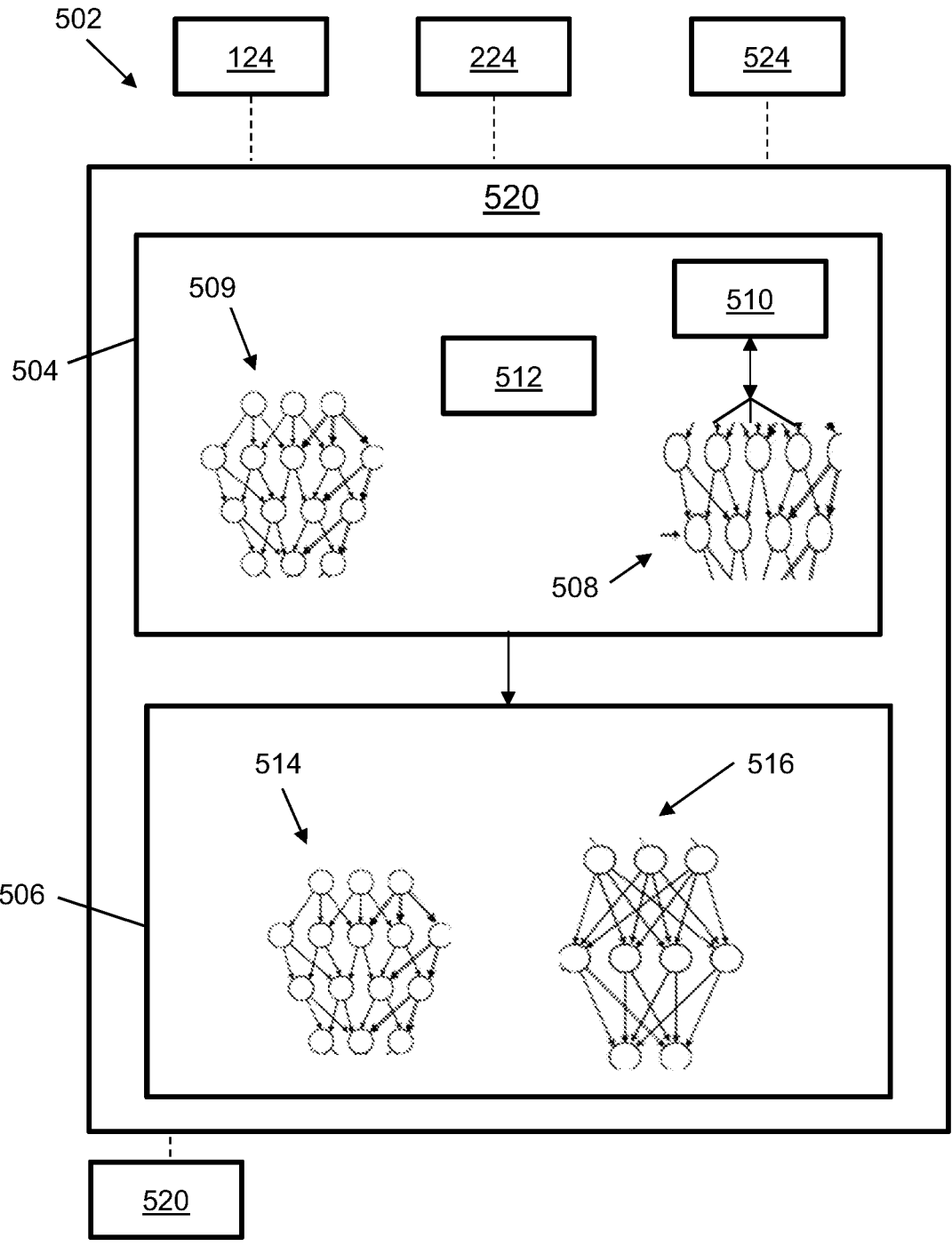
FIG. 5 is a schematic logic diagram of an artificial intelligence program including a front-end and a back-end algorithm.
Figure 6:
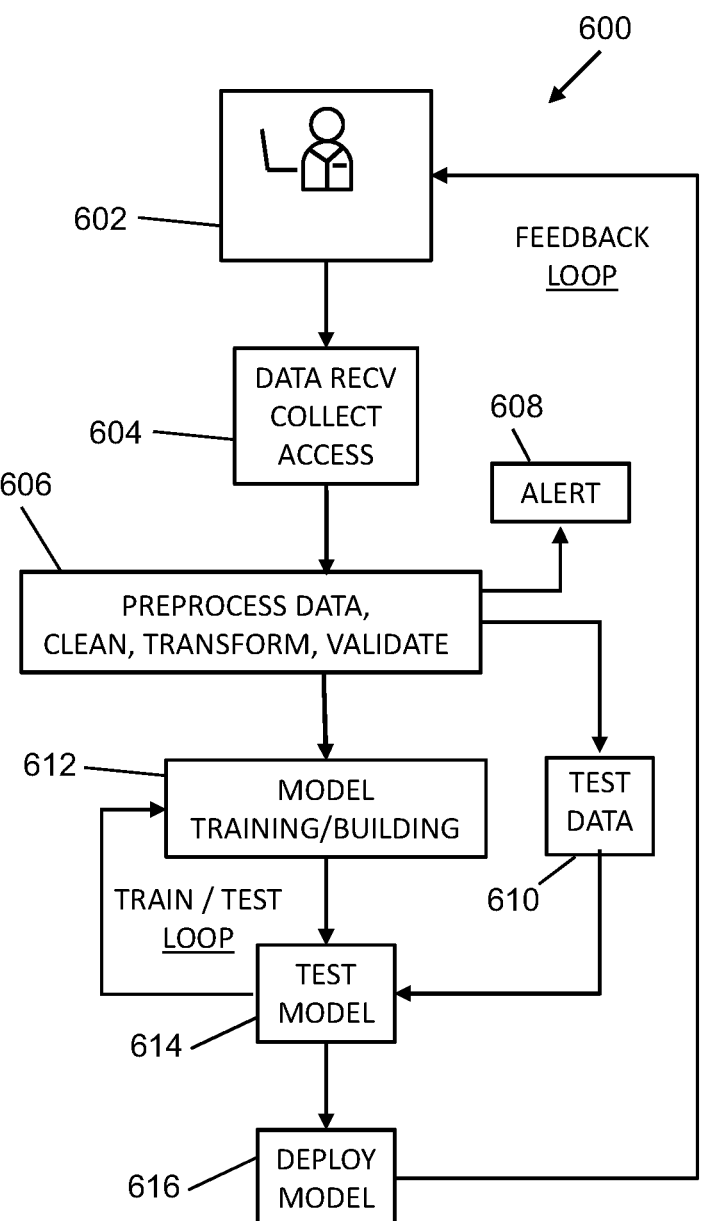
FIG. 6 is a flow chart representing a method model development and deployment by machine learning.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

FIG. 5 is a flow chart representing a method 500, according to at least one embodiment, of model development and deployment by machine learning. The method 500 represents at least one example of a machine learning workflow in which steps are implemented in a machine learning project.

In step 502, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 502 can represent a starting point. However, with regard to continuing or improving an ongoing machine learning workflow, step 502 can represent an opportunity for further user input or oversight via a feedback loop.

In step 504, user evaluation data is received, collected, accessed, or otherwise acquired and entered as can be termed data ingestion. In step 506 the data ingested in step 504 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 506 is updated with newly ingested data, an updated model will be generated.

Step 506 can include data validation, which focuses on confirming that the statistics of the ingested data are as expected, such as that data values are within expected numerical ranges, that data sets are within any expected or required categories, and that data comply with any needed distributions such as within those categories. Step 506 can proceed to step 508 to automatically alert the initiating user, other human or virtual agents, and/or other systems, if any anomalies are detected in the data, thereby pausing or terminating the process flow until corrective action is taken.

In step 510, training test data such as a target variable value is inserted into an iterative training and testing loop. In step 512, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 514, where the model is tested. Subsequent iterations of the model training, in step 512, may be conducted with updated weights in the calculations.

When compliance and/or success in the model testing in step 514 is achieved, process flow proceeds to step 516, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Accessing the Provider System

Users interact with a provider and access the provider network through a user computing device running one or more integrated software applications that generate a GUI rendered on a display. The software applications can include, for example, an Internet browser software application or a dedicated software application such as a "mobile app." The user computing device interacts with components of a provider system, such as various network computing devices (i.e., a server).

In particular, user computing devices communicate with a provider system by sending data to and from external, public-facing component of the provider computing system, such as an external server that can be a web server or other external communication computing device. The external server in turn interacts with an interface computing device also associated with a provider computing system. Among other functions, interface computing device is responsible for processing sensitive data gathered from the provider computer system. The interface computing devices thus prevent third-party computing devices and applications and from having direct access to the sensitive data stored to a provider system.

The provider external server process communication data requests sent to, and received from, the user computing device or from third party applications and computing devices. The external server routes communications requesting sensitive data through the internal sever for secure communication. The internal server in turn communicates with other back end components of the provider system, such as databases and servers that store sensitive user data (e.g., account numbers, addresses, resource availability data, etc.).

In accessing the provider system, the user computing device transmits a user interface transmit command to the external server that can include: (i) an Internet Protocol ("IP") address for the user computing device; (ii) system configuration data; and (iii) navigation data (e.g., data corresponding to browsing history, or websites and Internet Protocol addresses accessed by the user computing device). In response to the user interface transmit command, the external server returns provider display data and a digital cookie that is stored to the user computing device and used to track functions and activities performed by the user computing device.

In some embodiments, the system configuration data and navigation data is utilized by the external server to generate the provider display data. For instance, the system configuration data may indicate that the user computing device is utilizing a particular Internet browser or mobile software application to communicate with the provider system. The external server then generates provider display data that includes instructions compatible with, and readable by, the particular Internet browser or mobile software application. As another example, if the navigation data indicate the user computing device previously visited a provider webpage, the provider display data can include instructions for displaying a customized message on the user computing device, such as "Welcome back!"

After receiving provider display data, the user computing device processes the display data and renders GUI screens presented to users, such as a provider website or a GUI within a provider mobile software application. In some embodiments, the system configuration data may be sent to the provider system in a separate message subsequent to the user interface transmit command message.

The provider display data can include one or more of the following: (i) webpage data used by the user computing device to render a webpage in an Internet browser software application; (ii) mobile app display data used by the user computing device to render GUI screens within a mobile software application; and (iii) user account data that is used by the user computing device to render a webpage GUI that provides users access to view user resource availability data (e.g., account types and balances) and to view, select, and establish utilization demand metrics. Categories of webpage or mobile app display data can include graphical elements, digital images, text, numbers, colors, fonts, or layout data representing the orientation and arrangement graphical elements and alphanumeric data on a user interface screen.

The user computing device may also transmit system configuration data to the provider system that is used to evaluate a user or authenticate the user computing device. System configuration data can include, without limitation: (i) a unique identifier for the user computing device (e.g., a media access control ("MAC") address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device authenticates to the provider system if the user has an existing electronic account with the provider. The user computing device navigates to a login GUI and enters user authentication data, such as a user name and password. The user then selects a submit function on an user interface display screen to transmit an user authentication request message that includes the user authentication data to the provider external server. In some embodiments, the user authentication data and user authentication request message can further include elements of the system configuration data that are used to authenticate the user, such as a user computing device identifier or internet protocol address.

The external server passes user authentication request message to an identity management service, which performs a verification analysis to verify the identity of the user or user computing device. The verification analysis compared the received user authentication data to stored user authentication data to determine whether the authentication data sets match. The identity management service, thus, determines whether a correct user name, password, device identifier, or other authentication data is received. The identity management service returns an authentication notification message to the external server. The authentication notification message includes a verification flag indicating whether the verification passed or failed and a reason for a failed authentication, such as an unrecognized user name, password, or user computing device identifier.

The user authentication request message can also include system configuration data, and the back end server can use system configuration data and user account data to perform the authentication process. As one example, the identity management service might store a user computing device MAC address to a database record as part of the user account data. Upon receipt of an user authentication request message that includes a MAC address, the identity management service compares the received MAC address against stored MAC address data associated with the user account data. In this manner, the user computing device can also be authenticated to the provider system. If the received and stored MAC addresses do not match, the identity management service returns an authentication decision message to the external server indicating the authentication failed because the user computing device could not be authenticated. The external server can then prompt the user to verifying whether the consumer is using a new device to login to the provider system, and if so, being the process of registering a new device to the provider's system.

The system may also utilize multifactor authentication techniques ("MFA") to authenticate the user identity or a user computing device. As one example, if the user authentication data is successfully verified, a MFA software process running on the provider system can initiate a telephone call to a phone number stored as part of the. Upon receiving the call, the user selects an input function on the telephone to transmit response data to the MFA software process that confirms receipt of the call, thereby further authenticating the user's identity. The function can be the user's selection of any key on the telephone or a pre-determined sequence of keys, such as a passcode.

Those of skill in the art will appreciate that other forms of MFA are possible, such as sending a text message containing a passcode to the user's cellular phone that must be entered into a user interface screen or utilizing a separate software application running on the user computing device to generate a key or passcode that is verified by the provider system.

The user account data can include a variety of information, such as: (i) the unique user identifier; (ii) user residential data indicating a geographic region where the user resides (e.g., a zip code, city, state); (iii) one or more product identifiers that indicate the accounts or products currently held by a user; (iv) user resource availability data (e.g., balances for various product types or account types associated with, or held by, a user); (v) average resource availability data that indicates the average value of products or account balances maintained by the user over a given time period (e.g., an average monthly balance for an account held by the user); (vi) utilization data that includes data and information relating to user transactions and utilization of resources, such as resource value data (i.e., the value or amount of resources expended or utilized in a given transaction), the date and time of any transactions, and other transaction data discussed below; or (vii) average resource utilization volume data indicating the average number of transactions a user conducts using a given product over a given time period (e.g., the number of resource expenditures per month for a given account or accounts).

Establishing Utilization Demand Metrics

After authenticating a user identity and/or a user computing device, the user computing device can process the provider display data, which can include user account data, to render a Resource Availability GUI that displays resource availability data. The resource availability data represents quantitative values of resources available at a given instance in time (e.g., current values, or a value on a particular day). The resource availability data is stored to a Resource Database on the provider system, such as a secured back end server, as a series of individual availability database records. The availability database records correspond to individual transactions performed by a user over time where each transaction involves the utilization or expenditure of resources.

The Resource Database is implemented as a relational database that stores the resource availability data. The Resource Database also stores information that includes, without limitation: (i) resource value data representing the value of resources utilized during transaction; (ii) utilization event time code data (e.g., a transaction date and time); (iii) an available account identifier (e.g., an account name or number); (iv) a unique user identifier (e.g., an account owner or authorized user having access to view or utilize the resources stored to an account); (v) resource categorization data (e.g., an alphanumeric identifier that classifies resource utilization data that may relate to the purpose for which resources are utilized); and/or (vi) a transaction identifier that identifies or characterizes a transaction during which resources were utilized where the transaction is identified according to an assigned transaction number, a terminal administrator identifier (i.e., a name for a retailer that processed a transaction), or geographic location data where a given transaction occurred (e.g., a zip code or city and state).

User computing devices can also access and display a Utilization Demand Metrics GUI, such as the example Utilization Demand Metrics GUI shown in FIG. 7, that provides an interface where users can establish or modify utilization demand metrics. Once input into the Utilization Demand Metrics GUI and saved, the utilization demand metrics are stored to a Resource Utilization Metrics database on the provider computing system. The provider computing system also sets a resource metrics flag indicating to the Resource Monitor software service that incoming remote utilization demands should be processes using the utilization demand metrics. When stored to the Resource Utilization Metrics database, the resource utilization metrics are stored as database records that include or are associated with a particular unique user identifier, utilization threshold account identifier data that identifies one or more user accounts, and optionally, the resource metrics flag. The utilization demand metrics are used by a Resource Monitor software service to process incoming remote utilization demands, as discussed more fully below.

The utilization demand metrics include customizable settings or thresholds that place limitations and parameters on resource utilization. Utilization demand metrics are stored as database records that can include, without limitation: (i) utilization duration data (e.g., a provisional duration during which a resource utilization threshold is enforced); (ii) utilization threshold data (e.g., a quantitative resource value that cannot be exceeded so as to limit resource utilization for a specified duration); (iii) utilization category threshold data as a type of utilization threshold data that represents a quantitative resource value placing a limit on resource utilization for a particular category of transactions; (iv) resource compliance data that specifies a system response when a threshold condition is reached, such as denying a remote utilization demand or permitting the remote utilization demand while generating a notification displayed on a user computing device or terminal computing device; and (v) utilization threshold account identifier data that identifies a user account to which resource utilization threshold limitations are applied.

The utilization demand metrics can be better understood with reference to the following simplified examples. A user selects input functions on the Utilization Demand Metrics GUI to establish utilization duration data that includes a time code start (e.g., a date and/or time) and defined duration data, thereby establishing a duration such as two weeks from a specified start date. In other embodiments, users can establish utilization duration data that includes a time code start and a time code end, which defines a time period or date range whereby utilization thresholds are enforced.

The user also specifies utilization threshold data, such as a quantitative value corresponding to an upper limit to resource utilization. The utilization threshold data is associated with utilization durational data and stored to the Resource Utilization Metrics database for use by the Resource Monitor software service to enforce resource utilization limitations over a given time period. In this manner, a user can set a limit on resource utilization occurring between two dates or over a specific time period (e.g., a limit to resource expenditures over a week or month).

Turning again to utilization demand metrics, the user can also specify utilization category threshold data that places a limit on resource utilization over a specified time period for particular categories of transactions. Incoming remote utilization demands are categorized according to a finite set of transaction types, such as recreation, health, or transportation. Utilization category threshold data can be specified for each transaction type such that an upper limit on resource utilization is enforced for each type of transaction. In this manner, users are limited to utilizing a particular amount of resources over a given time period for a particular transaction type, such as using only $100 of available resources for transportation in a week or 10% of available resources for recreation in a month.

The utilization demand metrics can be also specified on a per account basis or for multiple accounts at one time. That is, user can specify utilization duration data and utilization threshold data limitations that are associated with utilization threshold account identifier data that identifies one or more account for a user. The utilization thresholds can be applied to each account held by a user, for single account, or for a combination of accounts. For instance, if a user has three separate accounts, the user can specify that a $1,500 resource limitation threshold applies to only one account over a given month, or the threshold can be applied to limit the total resource utilization from all three accounts for the month. In other cases, users can establish distinct resource threshold limitations for each of the three accounts or for only a subset of the accounts.

Establishing a Communication Session for
Transmission of a Utilization Demand

Utilization demand metrics are applied to evaluate individual transactions by the Resource Monitor software service. A user may initiate a remote utilization demand at a remote location using a user computing device, such as a smart phone or smart card device having an integrated microprocessor, memory, and software applications integrated with the smart card itself. The remote utilization demand can be initiated at a location such as a point of sale device in a retail location, or a remote utilization demand can be initiated from home or work such as when a user is operating a personal computing device to initiate online transactions.

The remote utilization demands are initiated by a user operating a user computing device and then transmitted to a terminal computing device operated by a third party, such as a brick-and-mortar or online retailer. The terminal computing device can be, for example, a mobile computing device such as a tablet computer or a point-of-sale device at a retail location. In other embodiments, the terminal computing device can be a network device, such as a server, that processes incoming remote utilization demands generated by user computing devices that are initiating transactions over the Internet.

The terminal computing device generates terminal data that is presented to a user on a display screen. Terminal data can include utilization value data, which represents the value or amount of resources to be utilized during a transaction, as well as utilization product identifier data that represents products or services subject to a utilization demand transaction. The user computing device initiates a remote utilization demand by first providing data that verifies the identity of the user and/or the user computing device. Once verified, the user computing device transmits additional data and information relevant to the utilization demand, such as an utilization demand account identifier and provider identifier data.

User and/or device identity can be authenticated using techniques described above, such as verifying authentication data (e.g., a password) or verifying system configuration data. In some embodiments, users and devices are verified using authentication data such as a personal identification number ("PIN") or card verification value ("CVV"), received from a user and comparing the received authentication data to known values stored to a database on the provider system. In some embodiments, when a user generates a remote utilization demand using a smart card, smartphone, or other device with a secure chip, authentication can be accomplished through symmetric or asymmetric key encryption for authentication. Encryption methods can include, for instance, symmetric Data Encryption Standard ("DES"), 3DES, and public key Rivest-Shamir-Adleman's algorithm ("RSA").

Asymmetric key encryption uses a private encryption key that must be kept secret from unauthorized users and a public encryption key that can be made available through unsecure channels. The public and private keys are mathematically linked. Transmitted data encrypted with the public key can be unencrypted only with the private key, and data encrypted with the private key can be verified only with the public key. Suitable asymmetric key encryption algorithms include, but are not limited to, the RSA algorithm, elliptic curve cryptography, Internet Key Exchange protocols, and PGP encryption protocols, among others.

In a particular communication session between two devices, each device utilizes its own public-private encryption key pair. The encryption key pairs can be exchanged between devices during the initiation of a communication session or during an authentication and enrollment process. Alternatively, the encryption key pairs can be preinstalled on the computing devices prior to being placed into production. In other words, prior to being used to implement the systems and methods of the present invention, the provider system can be loaded with both its own public-private encryption key pair and the public-private key pair of a user computing device or smart device.

During a communication session, the user smart device or user computing device can create a random number that is encrypted using a private key. The encrypted information is transmitted to a third party computing device that decrypts the information utilizing the public key to verify that the user device signed the communication. Conversely, communications transmitted back to the user device can be encrypted by the third party computing device using the public key and decrypted by the user device using the private key to verify the authenticity of the communication.

The user computing device, which may be a smart card or mobile computing device, and the terminal computing device can each include a built-in encrypted digital certificate. The digital certificate is issued by a trusted certificate authority that verifies the security and authenticity of a provider. The certificate authority is a registration authority that acts as a verifier for the certification authority before certificates including information of public keys or private keys and digital certifications are issued to requesters, one or more directories where the certificates with their public keys are held, and a certification management system that manages the certificates.

In public key cryptography, public and private keys are simultaneously created using the same algorithm by a certification authority. The private key is given only to requesters, and the public key is disclosed in directories, which all users can access, as parts of digital certificates. The private key is not shared with another user or is not transmitted across the Internet. A user uses a private key to decrypt a text that has been encrypted using the user's public key by someone else who can find out the user's public key from a public directory. Therefore, if a transmitter sends a certain message, the user can find out the public key of a receiver through a central administrator, and then sends the message encrypted using the public key. The receiver receiving the message decrypts the message using the user's private key. In addition to encrypting the message, the transmitter can authenticate the user by using the user's private key to encrypt a digital certificate.

The digital certificate is encrypted using a private key and transmitted from one device to another as part of commencing a communication session. The digital certificate is decrypted using the public key of the receiving device, and the resulting decrypted data is compared against known values to authenticate the certificate holder.

Once a device is authenticated using a digital certificate, a communication session between two devices can be established, such as between a user computing device and a terminal computing device. During a communication session, a transmitting device encrypts or encodes a communication with a private key prior to transmitting a message. Upon receipt of a communication from a transmitting computing device, the receiving computing device uses a corresponding public key to unencrypt the communication.

Those of skill in the art will appreciate that the above examples are not intended to be limiting, and other suitable techniques can be used to authenticate and secure remote utilization demands. For instance, rather than a random number, a user smart card or user computing device can transmit encrypted system configuration data verified by a provider computing system.

In some embodiments, user device information can be encrypted using one-way hashing techniques that apply a hashing algorithm to known data to create a one-way hash value. Any suitable hashing algorithm can be used, including, but not limited to, SHA-1 or SHA-2 algorithms. A one-way hash value is preferably a value of fixed length that is unique to the known data. In other words, if the known data is changed in any respect, the hash value will also change. The hash value, thus, acts as a fingerprint for the known data. The smart device, user computing device, terminal computing device, or a provider computing system can also optionally apply a digital "signature" or certificate authority to data included in the various communication. The digital signature or certificate authority further authenticates the source of a communication and can be accomplished using any suitable technique known to one of ordinary skill in the art.

Processing a Remote Utilization Demand

Figure 8:
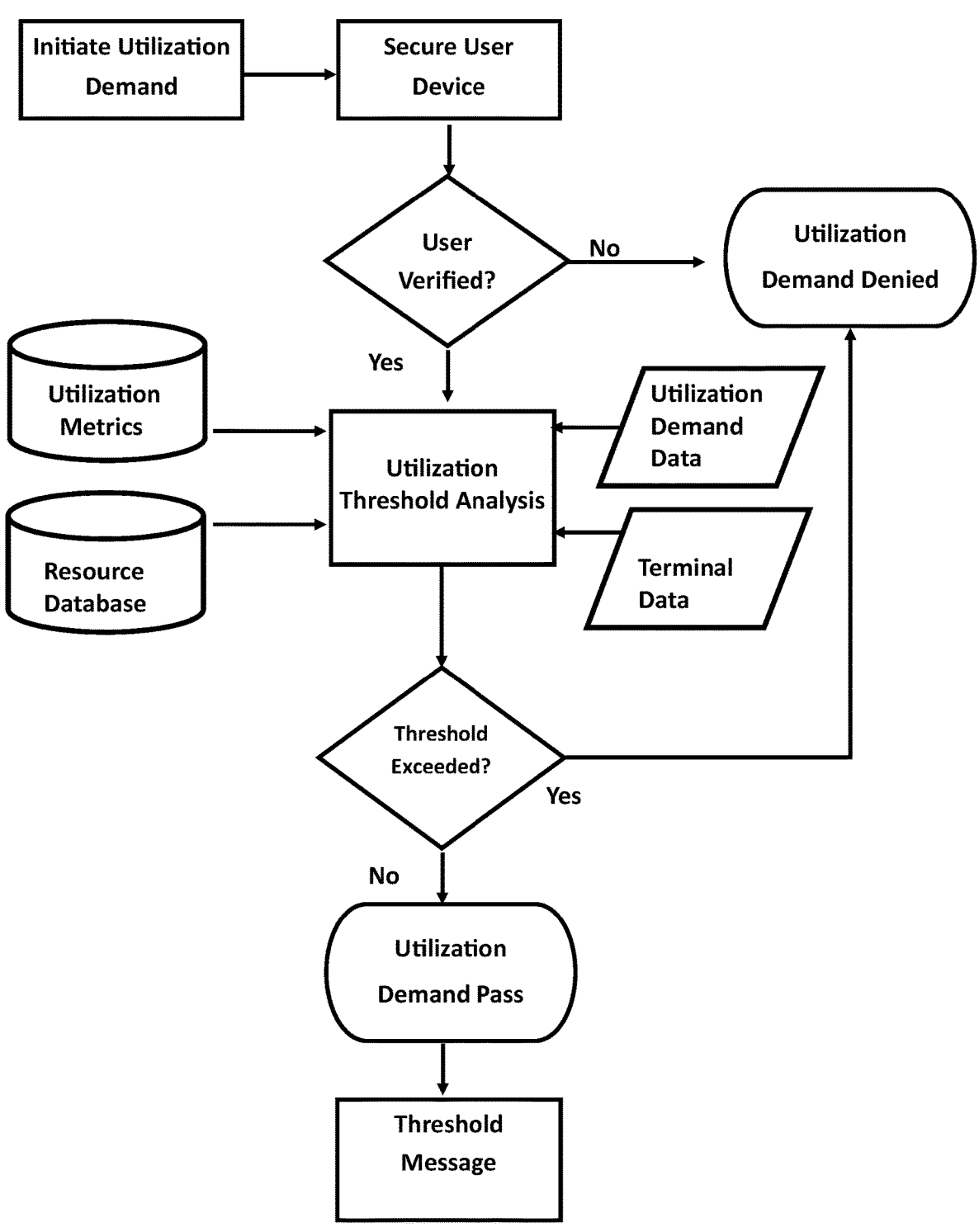
FIG. 8 is a flow chart representing a method for application of utilization thresholds according to one embodiment.

FIG. 8 illustrates an example process for applying resource utilization thresholds. The terminal computing device presents relevant terminal data to a user through a display screen on the terminal computing device or a display screen on the user computing device. Relevant terminal data includes, for instance, the utilization value data. The user then initiates a communication session by first verifying the user and/or user computing device through entering or transmitting authentication data, a certificate authority, or other relevant authentication information described above.

Once a communication session is established, the user computing device or the terminal computing device generates the remote utilization demand as a packet or message that includes various elements of data. The remote utilization demand is transmitted to the provider system and processed by the Resource Monitor software service. Communications between the user computing device and the terminal computing device, and communications with the provider system, can all be encrypted using symmetric or asymmetric encryption techniques. Communications are encoded or encrypted using a private key prior to transmission and then decoded or unencrypted using a public key by the receiving computing device.

The remote utilization demand transmitted to the provider computing system includes, without limitation, information such as: (i) utilization value data (i.e., an amount or value of resources requested for utilization); (ii) utilization demand time code data (e.g., a date and time for the remote utilization demand); (iii) an utilization demand account identifier; (iv) unique user identifier data; (v) provider identifier data; and/or (vi) provider routing data used to properly route the remote utilization demand to the provider system.

In some embodiments, the terminal computing device generates terminal data that is sent to the provider computing system. The terminal data can be included as part of the remote utilization demand or sent as a separate transmission to the provider system. The terminal data can include data and information that relates to a given transaction, identifies the terminal computing device, and/or that characterizes the third party that owns or administers the terminal computing device. The terminal data can include, without limitation: (i) terminal device identifier data; (ii) terminal administrator identifier data that identifies the third party that administers or owns the terminal computing device; (iii) a terminal source categorization code (e.g., a code, name, or other data corresponding to a transaction category); (iv) utilization product identifier data that identifies a product, service, or other subject of the utilization demand (i.e., the reason resources were being demanded, expended, or utilized); or (v) terminal location data corresponding to a geographic location where the terminal computing device is located.

The Resource Monitor software retrieves data from the Resource Utilization Metrics database, including the utilization duration data and/or a resource metrics flag to determine if the user established resource utilization metrics that should be used to process incoming remote utilization demands. If no utilization duration data is present, or if the resource metrics flag is not set or set to a first "negative" value, the Resource Monitor software services does not process the incoming remote utilization demand. If, however, the Resource Utilization Metrics database includes active utilization duration data or the resource metrics flag is set to a second, "positive" value, then the Resource Monitor processes the remote utilization demand. Active utilization duration data is present when the current date or time, or the date and time of a remote utilization demand, falls within the range of times and dates represented by the utilization duration data.

The Resource Monitor software service retrieves the utilization demand time code data from the remote utilization demand and determines whether the utilization demand time code data falls within a date or time range of the utilization duration data—that is, whether there are active resource thresholds in place. When utilization demand time code data from the remote utilization demand falls within the utilization duration data, the Resource Monitor determines whether the Resource Utilization Metrics database includes active utilization threshold data, including active utilization category threshold data. That is, the Resource Monitor software service determines whether there are resource thresholds or transaction category thresholds that are active and in place for processing.

If the Resource Utilization Metrics database includes utilization threshold data for processing, the Resource Monitor service accesses the availability database records stored to the Resource Database. The Resource Monitor software service creates a threshold evaluation set of availability database records that includes those availability database records having utilization event time code data falling within or corresponding to, the utilization duration data (i.e., identify database records that fall within the time frame to which resource limitations are to be enforced or applied). The Resource Monitor software service then aggregates resource value data included within the threshold evaluation set of availability database records and adds the utilization value data from the remote utilization demand to generate current utilization demand data.

The current utilization demand data is compared against the utilization threshold data. If the current utilization demand data exceeds the utilization threshold data, the Resource Monitor generates a utilization threshold message indicating whether the threshold was exceeded or not. The utilization threshold message can include a demand fail command if the current utilization data exceeds utilization threshold data, or the utilization threshold message can include a demand pass command if the current utilization data does not exceed the utilization threshold data.

The Resource Monitor software application further retrieves the resource compliance data to determine what action should be taken in the event of an exceeded threshold. Actions can include, for instance, transmitting a utilization threshold message to the terminal computing device and/or the user computing device for display to a user indicating whether or not the utilization threshold data was exceeded. When the utilization threshold data is exceeded, the demand fail command can comprise computer-readable instructions to display a message to the user that the threshold limitations have been, or would be, exceeded by the current utilization demand. Conversely, when the utilization threshold data is not exceeded, the demand pass command can comprise computer-readable instructions to display a message to the user that the threshold limitations have not been, or would not be, exceeded by the current utilization demand. Thus, the display to the user indicates whether the remote utilization demand passed (i.e., is approved or authorized) or failed (i.e., the demand is denied).

The utilization threshold message can include display data generated by the provider computing system or the terminal computing device. The utilization threshold message can be transmitted to the terminal computing device or user computing device for display in an Internet Browser software application, as a short messaging service ("SMS") message (i.e., a text message), or for display in a mobile software application made available by a provider. In other embodiments, the utilization threshold message is transmitted for display as a "push notification."

The resource compliance data can further indicate that a remote utilization demand should be denied, or "fail," in the event the utilization threshold data is exceeded by the current utilization demand data, thereby causing the transaction to terminate. In that case, the demand fail command includes computer-readable instructions that deny the remote utilization demand so that the terminal computing device does not complete the transaction subject to the remote utilization demand.

Similarly, the demand pass command can include computer-readable instructions that authorize the remote utilization demand so that the transaction subject to the utilization demand is completed. If the transaction is completed, the utilization value data, utilization demand time code data, and other data from the remote utilization demand can be stored to Resource Database as an availability data record for use in processing future remote utilization demands. Likewise, if the utilization threshold data is not exceeded, the transaction data from the terminal computing device can also be stored to the Resource Database as part of an availability data record.

The remote utilization demand can include one or more utilization demand account identifiers. The Resource Utilization Metrics database also includes utilization threshold account identifier data that identifies one or more user accounts to which the utilization duration data and utilization threshold data are applied. For instance, the Utilization Demand Metrics GUI shown in FIG. 7 illustrates utilization threshold data and utilization category threshold data that is to be applied to multiple user accounts. The Resource Monitor software services determines whether the utilization demand account identifier matches one or more user account identifier in the Resource Utilization Metrics database—that is, whether the account subject to the remote utilization demand is one of the accounts to which resource thresholds are applied.

When processing a remote utilization demand, the Resource Monitor software service creates a threshold evaluation set of availability database records by identifying each availability data record in the Resource Database that both (i) has an available account identifier corresponding to an account identifier specified in the remote utilization demand, and (ii) that has utilization event time code data corresponding to utilization demand time code data from the remote utilization demand. The Resource Monitor software service then aggregates the resource value data for each of the availability database records from the threshold evaluation set and generates current utilization demand data by also including the utilization value data. The Resource Monitor software service then determines whether the current utilization demand data exceeds the applicable utilization threshold data, thereby applying resource utilization limits across multiple accounts.

The utilization threshold data may comprise utilization category threshold data that corresponds to resource thresholds that apply to one or more particular categories of transactions for which resources are utilized or expended. When utilization category threshold data is present, the Resource Monitor software service determines whether the remote utilization demand or terminal data includes a terminal source categorization code that corresponds to the utilization category threshold data. If so, the resource utilization thresholds are applied to the remote utilization demand.

In some embodiments, the system utilizes a set of standard category codes to categorize transactions where each code corresponds to a particular category (e.g., a first code for health, a second code for transportation, etc.). The resource categorization data from the Resource Database and the terminal source categorization code from the terminal data are thus set to a value within the standard set of category codes. The terminal source categorization code can be set by a terminal computing device owner or administrator by selecting from among the standard category codes and stored to the Resource Database as resource categorization data. The provider can itself edit or set category codes stored as resource categorization data.

In other cases, the terminal source categorization code can be defined according to a standard set of codes while the resource categorization data is defined by the provider according to customized categories. The terminal source categorization data, set to standard category codes, can be mapped in a lookup table to the provider customized resource categorization data. For instance, the terminal source categorization data might have a category code value of "2" that the provider maps to a resource categorization data value of "transportation."

In yet other embodiments, the provider determines the resource categorization data using artificial intelligence technology to more accurately define the various categories of transactions by performing a utilization classification analysis. The provider system utilizes neural networks to process the remote utilization demand, the transaction data, user data, and the data from the Resource Database to determine the proper category identifier for a transaction that is the subject of a remote utilization demand. As an example, the terminal source categorization code might take a value that corresponds to "transportation," but by processing the user account data and the terminal data—which includes information such as terminal location data, terminal administrator identifier data, and user residential data—the Resource Monitor software service might determine that the transaction category is "fuel" or even "unleaded premium gasoline" or a separate utilization category such as "taxi fare" or "ride sharing fare." The result of the utilization classification analysis is stored as received resource categorization data and utilized as part of the utilization threshold analysis.

To further illustrate, the utilization classification analysis might recognize both that (i) the user account data includes product identifier data indicating that the user has an automobile loan, and (ii) the terminal administrator identifier data corresponds to a name that includes synonyms of the word "quick" that are often found in the names of fueling stations. In that case, those factors significantly impact the weights of particular nodes within the neural network, resulting in the received categorization data having a higher probability of corresponding to "fuel."

Using artificial intelligence techniques, the Utilization Demand Metrics GUI can display a range of utilization category threshold data allowing users to select from a wide array of accurate categories to which resource thresholds are applied. To illustrate, users are not limited to specifying resource utilization thresholds for broad categories such as "professional expenses," but instead, users can specify utilization thresholds for specific categories of professional expense, such as "licensures," "customer event," or "business travel." The Remote Monitor software service utilizes one or more known techniques to perform a utilization classification analysis that identities resource categorization data. Suitable known techniques can include Latent Semantic Analysis ("LSA"), Probabilistic Latent Semantic Analysis ("PLSA"), Latent Dirichlet Allocation ("LDA"), or a Correlated Topic Model ("CTM").

Utilizing the Resource Availability GUI, the user can be presented with the ability to review and edit the resource categorization data of specific availability database records. For instance, the Resource Monitor software service might categorize a particular database record as having resource categorization data set to a value of "professional event" that the user changes instead to "entertainment." This change is then stored to the Resource Database and can be used by the a utilization classification analysis to train neural networks that implement the analysis and enhance the accuracy of future iterations of the utilization classification analysis.

With respect to applying resource limitations relating to transaction categories, once the provider computer system receives the remote utilization demand, the Remote Monitoring software service determines if the resource metrics flag is set or if the utilization demand time code data falls within a date and time range specified by utilization duration data stored to the Utilization Demand Metrics database. If either condition is met, the Resource Monitor software service further determines if there is active utilization category threshold data to be applied to incoming remote utilization demands. If so, the Resource Monitor software service determines if the resource categorization data from the remote utilization demand corresponds to utilization category threshold data.

Alternatively, the Resource Monitor performs a utilization classification analysis using artificial intelligence techniques to determine received resource categorization data based in part on the utilization resource demand and transaction data. The received resource categorization data is then compared to resource category threshold data stored to the Resource Utilization Metrics database. In this manner, the Resource Monitor software application determines whether the remote utilization demand represents a transaction to which category thresholds should be applied.

When there is utilization category threshold data that is properly applied to the remote utilization demand, the Resource Monitor software service creates a threshold evaluation set of availability database records. The threshold evaluation set includes availability database records (i) having utilization event time code data corresponding to utilization duration data, and (ii) resource categorization data corresponding to utilization category threshold data stored in the Resource Utilization Metrics database (i.e., transactions corresponding to a particular category). The resource value data is aggregated for the availability database records in the threshold evaluation set and added to the utilization value data for the remote utilization demand to generate current utilization demand data.

The current utilization demand data is compared to the utilization category threshold data to determine whether the utilization category threshold has been exceeded. If the current utilization demand data exceeds the utilization category threshold data, the Resource Monitor generates a utilization threshold message indicating whether the threshold was exceeded or not. The utilization threshold message can include a demand fail command if the current utilization data exceeds utilization category threshold data, or the utilization threshold message can include a demand pass command if the current utilization category data does not exceed the utilization category threshold data.

Those of skill in the art will appreciate that the above examples are not intended to be limiting. In addition to applying resource utilization thresholds to categories of transactions, the resource utilization thresholds can also be applied to remote utilization demands having particular terminal administrator identifier data (i.e., applying thresholds to transactions with a particular third party), utilization product identifier data (i.e., applying thresholds to transactions involving a particular product or service and not just a category of products or services), geographic location (i.e., applying thresholds to transactions in a particular geographic area), or other criteria that define a resource utilization demand.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for automated application of utilization thresholds comprising a network computing device, a terminal computing device, and a user computing device, wherein the network computing device, the terminal computing device, and the user computing device each comprise one or more integrated software applications that perform the operations comprising:

(a) initiating a remote utilization demand through operations comprising (i) decoding a digital certificate received from a user computing device utilizing a shared key to create a received device identifier, (ii) comparing the received device identifier to a known device identifier stored to a network database, (iii) when the received device identifier matches the known device identifier, generating a remote utilization demand comprising utilization demand data, wherein the utilization demand data comprises (A) utilization value data, and (B) utilization demand time code data, and (iv) transmitting the remote utilization demand to the network computing device;

(b) receiving by a Resource Monitor software service running on the network computing device (i) the remote utilization demand, (ii) utilization demand metrics stored to a Utilization Demand Metrics database, wherein the utilization demand metrics comprise (A) utilization duration data, and (B) utilization threshold data, and (iii) availability database records stored to a Resource Database, wherein each availability data record comprises (A) resource value data, and (B) utilization event time code data;

(c) executing a utilization threshold analysis by the Resource Monitor software service comprising the operations of (i) generating a threshold evaluation set of availability database records that includes availability database records having utilization event time code data that falls within a duration represented by the utilization duration data, (ii) generating current utilization data by aggregating the utilization value data with the resource value data for availability database records within the threshold evaluation set, and (iii) determining whether the aggregated utilization value data and resource value data exceeds the utilization threshold data;

(d) generating by the network computing device, a utilization threshold message, (i) wherein the utilization threshold message comprises a demand fail command if the current utilization data exceeds utilization threshold data, and wherein (ii) the utilization threshold message comprises a demand pass command if the current utilization data does not exceed the utilization threshold data; and (e) transmitting the utilization threshold message to the terminal computing device for display to a user, wherein (i) when the terminal computing device receives a demand fail command, the terminal computing device transmits a message to the user computing device, wherein the message includes display data comprising content data for display by the user computing device, wherein the content data indicates that the utilization threshold data was exceeded and the remote utilization demand failed, and (ii) when the terminal computing device receives a demand pass command, the terminal computing device transmits a message to the user computing device, wherein the demand pass command has display data comprising content data for display by the user computing device, wherein the content data indicates that the utilization threshold data was not exceeded and the remote utilization demand passed.

2. The system for automated application of utilization thresholds of claim 1, wherein:

(a) the terminal computing device generates terminal data that comprises a terminal source categorization code;

(b) the Resource Monitor software service receives the terminal source categorization code from the terminal computing device;

(c) the availability database records received by the Resource Monitor software service further comprise resource categorization data;

(d) the utilization threshold data comprises utilization category threshold data; and (e) executing the utilization threshold analysis comprises the further operations of generating the threshold evaluation set by identifying and including only availability database records having resource categorization data that corresponds to the terminal source categorization code.

3. The system for automated application of utilization thresholds of claim 1, wherein:

(a) the remote utilization demand comprises a utilization demand account identifier received from the user computing device;

(b) the availability database records received by the Resource Monitor software service further comprise a available account identifier;

(c) the utilization demand metrics further comprise utilization threshold account identifier data associated with the utilization threshold data, where the utilization threshold account identifier data identifies one or more user accounts;

(d) the Resource Monitor software service performs the further operations of determining whether the utilization demand account identifier matches at least one user account identified by the utilization threshold account identifier data; and (e) executing the utilization threshold analysis comprises the further operations of generating the threshold evaluation set by identifying and including only availability database records having an available account identifier that matches at least one user account identified by the utilization threshold account identifier data.

4. The system for automated application of utilization thresholds of claim 1, wherein:

(a) when the terminal computing device receives a demand fail command, the terminal computing device displays a message on a digital display device indicating that the remote utilization demand failed; and (b) when the terminal computing device receives a demand pass command, the terminal computing device displays a message on the digital display device indicating that the remote utilization demand passed.

5. A system for automated application of utilization thresholds comprising a network computing device, a terminal computing device, and a user computing device comprising a processor, wherein the network computing device, the terminal computing device, and the user computing device each comprise one or more integrated software applications that perform the operations comprising:

(a) initiating a remote utilization demand through operations comprising (i) decoding a digital certificate received from a user computing device utilizing a shared key to create a received device identifier, (ii) comparing the received device identifier to a known device identifier stored to a network database, (iii) receiving system configuration data from the user computing device, (iv) comparing the system configuration data against known values stored to an identity management service database on a provider computing system, (v) when the received device identifier matches the known device identifier and when the system configuration data received from the user computing device matches the known values, generating a remote utilization demand comprising utilization demand data, wherein the utilization demand data comprises (A) utilization value data, and (B) utilization demand time code data, and (vi) transmitting the remote utilization demand to the network computing device;

(b) receiving by a Resource Monitor software service running on the network computing device (i) the remote utilization demand, (ii) utilization demand metrics stored to a Utilization Demand Metrics database, wherein the utilization demand metrics comprise (A) utilization duration data, and (B) utilization threshold data, and (iii) availability database records stored to a Resource Database, wherein each availability data record comprises (A) resource value data, and (B) utilization event time code data;

(c) executing a utilization threshold analysis by the Resource Monitor software service comprising the operations of (i) generating a threshold evaluation set of availability database records that includes availability database records having utilization event time code data that falls within a duration represented by the utilization duration data, (ii) generating current utilization data by aggregating the utilization value data with the resource value data for availability database records within the threshold evaluation set, and (iii) determining whether the aggregated utilization value data and resource value data exceeds the utilization threshold data;

(d) generating by the network computing device, a utilization threshold message, (i) wherein the utilization threshold message comprises a demand fail command if the current utilization data exceeds utilization threshold data, and wherein (ii) the utilization threshold message comprises a demand pass command if the current utilization data does not exceed the utilization threshold data; and (e) transmitting the utilization threshold message to the terminal computing device for display to a user.

6. The system for automated application of utilization thresholds of claim 5, wherein (i) the user computing device further comprises an integrated private encryption key, and (ii) the processor utilizes the private key to encode the digital certificate transmitted by the user computing device.

7. The system for automated application of utilization thresholds of claim 1, wherein initiating a remote utilization demand comprises the further operations of:

(a) receiving authentication data transmitted by the user computing device; and (b) comparing the authentication data against known values stored to an identity management service database on the provider computing system.

8. A system for automated application of utilization thresholds comprising a network computing device and a terminal computing device, wherein the network computing device and the terminal computing device each comprise one or more integrated software applications that perform the operations comprising:

(a) receiving by the network computing device, a remote utilization demand comprising utilization demand data, wherein the utilization demand data comprises (A) utilization value data, and (B) utilization demand time code data;

(b) receiving by a Resource Monitor software service running on the network computing device (i) the remote utilization demand, (ii) utilization demand metrics comprising (A) utilization duration data, and (B) utilization threshold data, and (iii) availability database records, wherein each availability data record comprises (A) resource value data, and (B) utilization event time code data;

(c) executing a utilization threshold analysis by the Resource Monitor software service comprising the operations of (i) generating current utilization data by aggregating the utilization value data with the resource value data for availability database records having utilization event time code data that falls within a duration represented by the utilization duration data, and (ii) determining whether the aggregated value data exceeds the utilization threshold data;

(d) generating by the network computing device, a utilization threshold message, (i) wherein the utilization threshold message comprises a demand fail command if the current utilization data exceeds utilization threshold data, and wherein (ii) the utilization threshold message comprises a demand pass command if the current utilization data does not exceed the utilization threshold data; and (e) transmitting the utilization threshold message to the terminal computing device for display to a user, wherein (i) when the terminal computing device receives a demand fail command, the terminal computing device transmits a message to the user computing device having display data comprising content data for display by the user computing device, wherein the content data indicates that the utilization threshold data was exceeded and the remote utilization demand failed, and (ii) when the terminal computing device receives a demand pass command, the terminal computing device transmits a message to the user computing device having display data comprising content data for display by the user computing device, wherein the content data indicates that the utilization threshold data was not exceeded and the remote utilization demand passed.

9. The system for automated application of utilization thresholds of claim 8, wherein:

(a) the Resource Monitor software service receives a terminal source categorization code from the terminal computing device, (b) the availability database records received by the Resource Monitor software service further comprise resource categorization data;

(c) the utilization threshold data comprises utilization category threshold data; and (d) executing the utilization threshold analysis comprises the further operations of generating a threshold evaluation set by identifying and aggregating resource value data from only availability database records having resource categorization data that corresponds to the terminal source categorization code.

10. The system for automated application of utilization thresholds of claim 8, wherein:

(a) the remote utilization demand comprises a utilization demand account identifier received from the user computing device;

(b) the availability database records received by the Resource Monitor software service further comprise a available account identifier;

(c) the utilization demand metrics further comprise utilization threshold account identifier data associated with the utilization threshold data, where the utilization threshold account identifier data identifies one or more user accounts;

(d) the Resource Monitor software service performs the further operations of determining whether the utilization demand account identifier matches at least one user account identified by the utilization threshold account identifier data; and (e) executing the utilization threshold analysis comprises the further operations of generating the threshold evaluation set by identifying and including only availability database records having an available account identifier that matches at least one user account identified by the utilization threshold account identifier data.

11. The system for automated application of utilization thresholds of claim 8, wherein:

(a) when the terminal computing device receives a demand fail command, the terminal computing device displays a message on a digital display device indicating that the remote utilization demand failed; and (b) when the terminal computing device receives a demand pass command, the terminal computing device displays a message on the digital display device indicating that the remote utilization demand passed.

12. A system for automated application of utilization thresholds comprising a network computing device and a terminal computing device, and a user computing device comprising a processor and an integrated private encryption key, wherein the network computing device and the terminal computing device each comprise one or more integrated software applications that perform the operations comprising:

(a) initiating a remote utilization demand through operations that comprise (i) the processor utilizes the private key to encode a digital certificate transmitted by the user computing device, (ii) decoding a digital certificate received from a user computing device utilizing a shared key to create a received device identifier, (iii) comparing the received device identifier to a known device identifier stored to a network database, (iv) when the received device identifier matches the known device identifier, generating a remote utilization demand comprising utilization demand data, wherein the utilization demand data comprises (A) utilization value data, and (B) utilization demand time code data, and (v) transmitting the remote utilization demand to the network computing device;

(b) receiving by the network computing device, a remote utilization demand comprising utilization demand data, wherein the utilization demand data comprises (A) utilization value data, and (B) utilization demand time code data;

(c) receiving by a Resource Monitor software service running on the network computing device (i) terminal data that comprises administrator identifier data generated by the terminal computing device, (ii) the remote utilization demand, (iii) utilization demand metrics comprising (A) utilization duration data, and (B) utilization threshold data, and (iv) availability database records, wherein each availability data record comprises (A) resource value data, and (B) utilization event time code data, and (C) transaction data;

(d) executing a utilization threshold analysis by the Resource Monitor software service comprising the operations of (i) generating a threshold evaluation set by identifying and including only availability database records having transaction data that corresponds to the terminal administrator data, (ii) generating current utilization data by aggregating the utilization value data within the threshold evaluation set having the resource value data with event time code data that falls within a duration represented by the utilization duration data, (iii) determining whether the aggregated value data exceeds the utilization threshold data;

(e) generating by the network computing device, a utilization threshold message, (i) wherein the utilization threshold message comprises a demand fail command if the current utilization data exceeds utilization threshold data, and wherein (ii) the utilization threshold message comprises a demand pass command if the current utilization data does not exceed the utilization threshold data; and (iii) transmitting the utilization threshold message to the terminal computing device for display to a user.

* * * * *